Patented Feb. 10, 1925.

1,525,996

UNITED STATES PATENT OFFICE.

JUSTIN JEFFERY, OF CHICO, CALIFORNIA.

COMPOSITION FOR COATING CAST-IRON-WELDING ELECTRODES.

No Drawing.   Application filed December 26, 1922.   Serial No. 609,138.

*To all whom it may concern:*

Be it known that I, JUSTIN JEFFERY, a citizen of the United States, residing at Chico, county of Butte, State of California, have invented certain new and useful Improvements in Compositions for Coating Cast-Iron-Welding Electrodes; and I do declare the following to be a full, clear, and exact description of the same.

This invention relates to improvements in the welding art, and particularly to welding by means of the electric arc, which as is well known to those in the profession, is much to be preferred for various reasons to the oxy-acetylene torch.

In the electric method, the member to be welded forms one electrode, while a rod of the welding metal serves as the other electrode, the arc being formed therebetween. For welding cast iron parts together, cast iron is far preferable to steel as the welding metal, but as far as I am aware, it has heretofore been impossible to use cast iron as a welding metal with the electric arc method. This is for various reasons, chief among which is the fact that the arc will not hold and the metal of the welding rod will not be transferred or caused to flow into the crack or joint between the parts to be welded.

The principal object of my invention is to provide a composition adapted to be applied to a cast iron rod so that the latter may be successfully used as a welding electrode with the electric arc method of welding.

Another object is to provide a composition for the purpose which will be simple and inexpensive to produce, and which can be very easily applied to the welding rods.

The ingredients used in my composition are preferably chlorate of potash, iron oxide (pure) borax, common baking soda, burnt lime, and plaster of Paris, the proportions of said ingredients by volume being approximately 1 part chlorate of potash, 1 part iron oxide, 2 parts borax, 2 parts soda, 2 parts burnt lime, and 2 parts plaster of Paris. I have found chlorate of potash to be the best compound for my purpose, though. Also, any of the iron oxides can be used with equal success.

The various ingredients are reduced to a powdered form, and mixed thoroughly together, enough water being added to the mass to make a paste, in which form the preparation will be put on the market.

The chlorate of potash or other similar chemical compound contains oxygen, which when heated is liberated, and uniting with the carbon adjacent the surface of the rod transforms the metal from cast iron to mild steel, so that the rod then has a mild steel coating: This results in the closing or contracting of the pores of the metal, forms a denser material thereof, and one for which the electric arc has greater affinity.

The oxide of iron has valuable fluxing properties. The borax, baking soda and lime not only have such properties, but serve to burn out dirt and impurities from the iron, and when heated a vapor emanates therefrom which, arising around the rod at the arcing point, surrounds the arc, and keeps the outside air from the weld. This excludes the nitrogen in the air, which retards combustion, from the welding point. The potassium chlorate when heated liberates free oxygen within the welding area in good quantity, and this will speed up combustion at such welding point. This all tends to materially aid in the proper functioning of the electric current and welding operation generally.

The plaster of Paris merely serves as a binder for the other ingredients and enables the composition to readily adhere to the rod when applied thereto.

The net result of applying my composition to a cast iron welding rod is to cause the iron to be reduced to a finely divided condition and to flow with and be deposited by the arc on to the negative electrode, which is the part to be welded, making a very strong joint.

Although the composition is particularly adapted to be applied to a cast iron welding electrode, since it is for this metal and for the electric process that it is most needed, its application to any welding rods and with any method of welding will give better results than can otherwise be attained.

Having thus described my invention, what I claim as new and useful and desire to secure by Letters Patent is:

1. A composition for coating welding rods comprising chlorate of potash, iron oxide, a purifying agent and vapor emanating agents.

2. A composition for coating welding rods comprising chlorate of potash, iron oxide, a purifying agent vapor amanating agents, and a binder.

3. A composition for coating welding rods comprising chlorate of potash, iron oxide, borax, sodium bicarbonate and burnt lime.

4. A composition for coating welding rods comprising chlorate of potash, one part, iron oxide, one part, borax, two parts, sodium bicarbonate, two parts, and burnt lime, two parts.

5. A composition for coating welding rods comprising chlorate of potash, iron oxide, borax, sodium bicarbonate, burnt lime, and a binder.

In testimony whereof I affix my signature.

JUSTIN JEFFERY.